(No Model.)
G. M. HUGHES.
VEHICLE WHEEL.
No. 378,961. Patented Mar. 6, 1888.
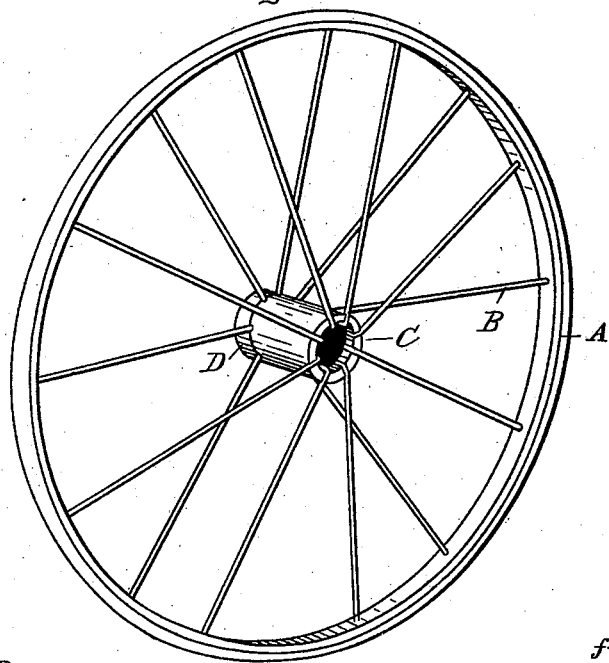
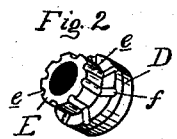
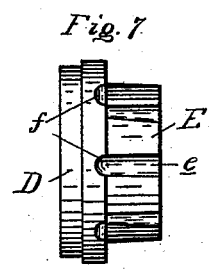
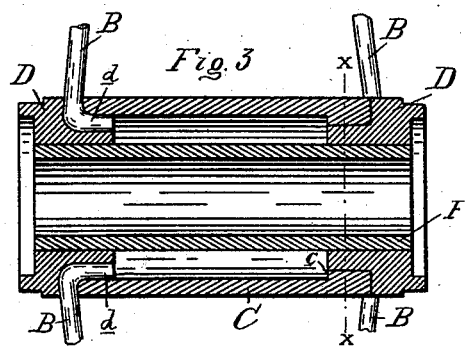
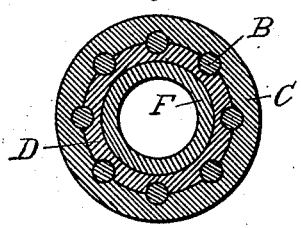
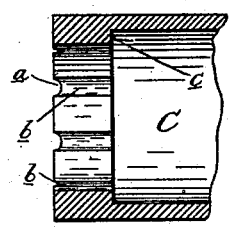
Witnesses:
P. M. Hulbert,
Inventor:
George M. Hughes.
By Thos. S. Sprague & Son.
Atty.

UNITED STATES PATENT OFFICE.

GEORGE M. HUGHES, OF AUBURNDALE, OHIO.

VEHICLE-WHEEL.

SPECIFICATION forming part of Letters Patent No. 378,961, dated March 6, 1888.

Application filed October 28, 1887. Serial No. 253,649. (No model.)

*To all whom it may concern:*

Be it known that I, GEORGE M. HUGHES, a citizen of the United States, residing at Auburndale, in the county of Lucas and State of Ohio, have invented certain new and useful Improvements in Vehicle-Wheels, of which the following is a specification, reference being had therein to the accompanying drawings.

This invention relates to new and useful improvements in vehicle-wheels; and the invention more particularly refers to that class of vehicle-wheels which are constructed of metal and provided with wire spokes.

The improvement consists in the peculiar manner of constructing the hub, whereby novel means are provided for securing and supporting the inner ends of the wire spokes, all as more fully hereinafter described.

In the drawings which accompany this specification, Figure 1 is a perspective view of a wheel constructed in accordance with my improvement, with one of the spoke-securing thimbles which secures the ends of the spokes removed and shown in separate perspective view, referred to as Fig. 2. Fig. 3 is a vertical central cross-section of the hub of a complete wheel. Fig. 4 is a cross-section on the line $x\ x$, Fig. 3. Fig. 5 is an end view of the hub detached from the other parts. Fig. 6 is a central section on line $y\ y$ in Fig. 5, and Fig. 7 is a side elevation of one of the spoke-securing thimbles.

A is a tire, B are the wire spokes, and C is a metallic hub, of a vehicle-wheel of known construction. The hub C is preferably malleable iron of tubular form, and provided upon its opposite ends with half-cylindrical spoke-notches $a$ and upon its interior with the corresponding half-cylindrical spoke-notches $b$, which communicate with the spoke-notches $a$, as shown. The spoke-notches $b$ extend some distance toward the center of the hub, at right angles, or nearly so, with the radial spoke-notches $a$, and in casting the hub I preferably cast these spoke-notches integrally with the hub and form the hub with the interiorly-projecting flange $c$, in which I form the spoke-notches $b$. The spoke-notches upon one end of the hub alternate with the spoke-notches upon the other end of the hub. The spokes B are single-wire spokes, and are secured at their outer ends to the tire and upon their inner ends are provided with the bend $d$, by means of which the inner ends of the spokes are engaged with the spoke-notches alternately upon opposite ends of the hub, as is usual in the construction of such wheels.

D is a cap integrally combined with the spoke-securing thimble E. The cap is of the ordinary description used to give a finished appearance to the outer end of the hub by concealing the inner ends of the spokes, and the thimble, which is combined therewith, forms a tubular projection upon the rear face thereof; and upon the outer face of the thimble and the rear face of the cap are formed spoke-notches $e\ f$, which are counterparts of the spoke-notches $b\ a$ upon the ends of the hub, all so arranged that when the combined cap and thimble is pressed into the end of the hub the inner ends of the spokes, together with the bent portion thereof, are entirely concealed in metal sockets.

It is the most essential part of my construction that the thimble is made of such dimensions in relation to the ends of the hub that pressure has to be applied in forcing the thimble into the aperture of the hub, so that the inner ends of the spokes are firmly clamped between without any danger or possibility of the parts becoming accidentally loose under any circumstances. To secure this object in the best manner I make the thimble E slightly tapering, so that in forcing it into place the spokes will be firmly wedged or clamped between into the spoke-sockets. I preferably then complete the wheel by providing the hub with the skein F, the ends of which are made to fit into the bores of the cap and thimble, and which then need only to be slightly pressed in to be firmly secured.

I am aware that it is not new to form spoke-notches upon the ends of the hub; nor is it new to use in connection therewith caps provided with corresponding spoke-notches. I am also aware that wheels of this kind have been constructed wherein the inner ends of the spokes are bent or hook-shaped; nor do I particularly claim sockets formed in the head to receive the hooked end of the wire spokes; but

What I claim as my invention is—

1. In a vehicle-wheel, the combination of an apertured metal hub provided with radial spoke-notches upon its end and longitudinal spoke-notches extending therefrom into the aperture of the hub, wire spokes provided with longitudinal bends upon their inner ends and engaging into these notches, thimbles provided with longitudinal spoke-notches for the bent end of the spokes and pressed into the apertures of the hub, and caps formed integrally with said thimbles and provided with radial spoke-notches for the straight inner ends of the spokes, all substantially as described.

2. The combination, in a vehicle-wheel, of single-wire spokes provided with longitudinal bends upon their inner ends, a metal hub provided with radial and longitudinal spoke-notches to engage with said spokes, and combined thimbles and caps secured into the ends of the hub, said thimbles being tapering and said thimbles and caps having radial and longitudinal spoke-notches correspondingly with the hub, substantially as described.

3. In a vehicle-wheel, the combination of the wire spokes B, provided with the hooks or bends $d$, the hub C, provided with the radial spoke-notches $a$ and longitudinal spoke-notches $b$, the thimbles E and caps D, integrally combined and provided with radial spoke-notches $f$ and longitudinal spoke-notches $e$, and the skein F, the parts being secured together substantially as described.

In testimony whereof I affix my signature, in presence of two witnesses, this 7th day of October, 1887.

GEORGE M. HUGHES.

Witnesses:
 H. S. SPRAGUE,
 JAS. WHITTEMORE.